United States Patent
Kempf et al.

(10) Patent No.: US 11,201,924 B2
(45) Date of Patent: Dec. 14, 2021

(54) HARDWARE-SOFTWARE COMMUNICATION SYSTEM FOR SENSOR SIGNAL MONITORING IN PROCESS AUTOMATION TECHNOLOGY

(71) Applicant: Endress+Hauser Conducta GmbH+Co. KG, Gerlingen (DE)

(72) Inventors: Stefan Kempf, Kornwestheim (DE); Stefan Robl, Hünxe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 16/712,019

(22) Filed: Dec. 12, 2019

(65) Prior Publication Data
US 2020/0195727 A1    Jun. 18, 2020

(30) Foreign Application Priority Data
Dec. 17, 2018    (DE) .................... 10 2018 132 384.0

(51) Int. Cl.
| | | |
|---|---|---|
| H04L 29/08 | (2006.01) | |
| H04L 29/06 | (2006.01) | |
| H04L 12/803 | (2013.01) | |
| G05B 15/02 | (2006.01) | |
| G06F 8/71 | (2018.01) | |

(52) U.S. Cl.
CPC ............ *H04L 67/125* (2013.01); *G05B 15/02* (2013.01); *H04L 47/125* (2013.01); *H04L 67/025* (2013.01); *H04L 67/42* (2013.01); *G06F 8/71* (2013.01)

(58) Field of Classification Search
CPC ..... H04L 67/125; H04L 67/025; H04L 67/42; H04L 47/125; G05B 15/02; G06F 8/71
See application file for complete search history.

(56) References Cited

U.S. PATENT DOCUMENTS

| | | | |
|---|---|---|---|
| 6,732,191 B1 | 5/2004 | Baker et al. | |
| 6,788,980 B1 | 9/2004 | Johnson | |
| 6,799,195 B1 | 9/2004 | Thibault et al. | |
| 7,558,843 B2* | 7/2009 | Lipscomb | G06Q 30/0601 707/999.101 |
| 8,646,020 B2* | 2/2014 | Reisman | H04N 21/41407 725/133 |
| 2002/0147936 A1 | 10/2002 | Wiczer | |
| 2002/0169804 A1 | 11/2002 | Faist et al. | |
| 2005/0228862 A1* | 10/2005 | Pavlik | H04L 29/06 709/205 |

(Continued)

FOREIGN PATENT DOCUMENTS

WO    2008155597 A1    12/2008

*Primary Examiner* — Sm A Rahman
(74) *Attorney, Agent, or Firm* — Mark A. Logan; Endress+Hauser (USA) Holding Inc.

(57) ABSTRACT

The present disclosure relates to a hardware-software communication system for sensor signal monitoring in process automation technology. The hardware-software communication system comprises at least one client, a system layer, and an application layer. The client and the system layer are communicatively connected and configured to communicate with one another. The system layer and the application layer are interconnected and are configured to communicate with one another independently of the client. The system layer is implemented as a server.

6 Claims, 3 Drawing Sheets

(56) References Cited

U.S. PATENT DOCUMENTS

| | | | |
|---|---|---|---|
| 2012/0079125 A1* | 3/2012 | Nixon | H04L 41/5041 709/230 |
| 2016/0012738 A1* | 1/2016 | Shafigh | G09B 5/06 434/309 |
| 2018/0152310 A1* | 5/2018 | Ansari | H04L 29/06027 |

* cited by examiner

HARDWARE-SOFTWARE COMMUNICATION SYSTEM FOR SENSOR SIGNAL MONITORING IN PROCESS AUTOMATION TECHNOLOGY

CROSS-REFERENCE TO RELATED APPLICATION

The present application is related to and claims the priority benefit of German Patent Application No. 10 2018 132 384.0, filed on Dec. 17, 2018, the entire contents of which are incorporated herein by reference.

TECHNICAL FIELD

The present disclosure relates to a hardware-software communication system for sensor signal monitoring in process automation technology.

BACKGROUND

In process automation technology, sensors are employed in order to monitor and control processes. These sensors send the measurement signals to a measurement transducer, which prepares the measurement signals and displays them directly at the measurement transducer, or transmits them to a central data processing point.

Measurement transducers consist of hardware and software. The operability and mode of operation of a measurement transducer is currently determined significantly by software.

The disadvantage with today's measurement transducers is that the execution of the measurement transducer software is tied to the specific measurement transducer and cannot be operated if separated therefrom. This implies several disadvantages. For example, a specific measurement transducer software must be developed for each measurement transducer. Moreover, if the measurement transducer software of a measurement transducer model is updated, each measurement transducer of this model must be separately updated.

SUMMARY

It is therefore an object of the present disclosure to design the measurement transducer software flexibly and cost-effectively for different measurement transducer models.

This object is achieved according to the present disclosure by the features of claim 1.

The hardware-software communication system according to the present disclosure for a sensor signal monitoring in process automation technology comprises at least one client, a system layer, and an application layer. The client and the system layer are communicatively connected and configured to communicate with one another. The system layer and the application layer are interconnected and are configured to communicate with one another independently of the client. The system layer is implemented as a server.

The hardware-software communication system according to the present disclosure makes it possible for a measurement transducer software to be operated on a system external to the measurement transducer, so that a simpler, less powerful, and more favorable measurement transducer hardware may be used for the measurement transducer itself.

A further advantage is that, via the hardware-software communication system according to the present disclosure, the measurement transducer software may be simultaneously updated for a plurality of measurement transducer hardware, and thus each measurement transducer does not need to be updated separately. The hardware-software communication system according to the present disclosure also enables remote control and remote diagnosis of the measurement transducers. The hardware-software communication system according to the present disclosure also allows connection to control systems and, for example, office computers.

According to one embodiment of the present disclosure, the client and the system layer are configured to communicate via a network protocol.

According to one embodiment of the present disclosure, the server is designed as a web service and the network protocol is HTTP or HTTPS.

According to one embodiment of the present disclosure, the client comprises a measurement transducer as a thin client and/or a control system and/or a remote access via web browser.

According to one embodiment of the present disclosure, the system layer and the application layer are suitable to be designed as a software version. The hardware-software communication system includes at least a first software version, a second software version, and a routing component. The routing component is suitable to connect the first version and/or the second version to the client.

According to one embodiment of the present disclosure, the hardware-software communication system comprises at least two clients, and the routing component is suitable to initially connect both clients to the first version and then connect at least one client only to the second version.

According to one embodiment of the present disclosure, the first software version and the second software version are constructed like a web service, and the routing component is a load balancer for HTTP or HTTPS.

According to one embodiment of the present disclosure, the client comprises a remote access via web browser, and the web browser is suitable to display a web page with a simulated measurement transducer.

BRIEF DESCRIPTION OF THE DRAWINGS

The present disclosure is explained in more detail on the basis of the following description of the figure.

DETAILED DESCRIPTION

Figure 1:
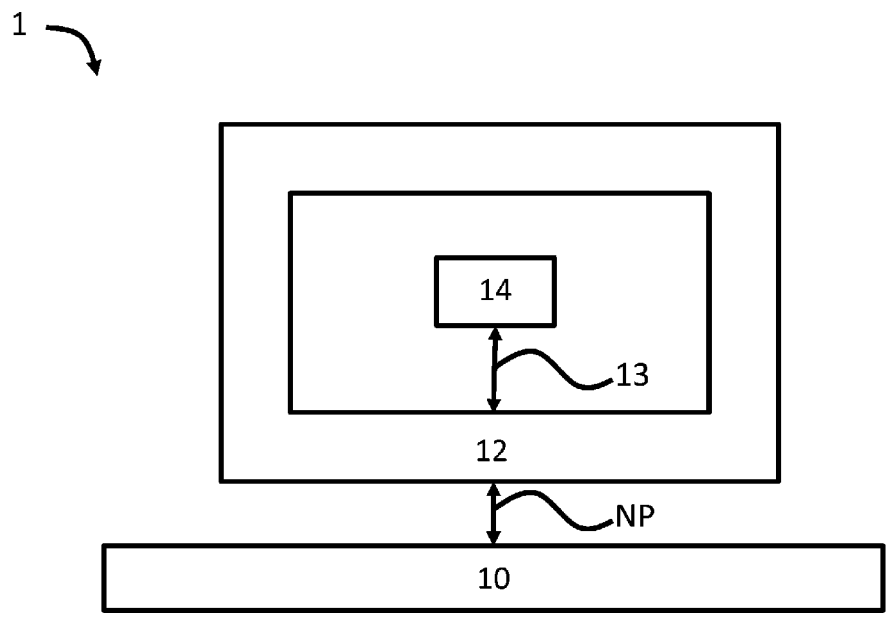
FIG. 1 shows a schematic arrangement of the hardware-software communication system according to the present disclosure.

FIG. 1 shows a schematic arrangement of the hardware-software communication system 1 according to the present disclosure. The hardware-software communication system 1 comprises at least one client 10, a system layer 12, and an application layer 14.

The client 10 and the system layer 12 are communicatively connected and configured to be able to communicate with one another. The client 10 will be discussed in more detail later.

The system layer 12 is an implementation tailored to a specific hardware/software environment on which the application layer 14 is used, which is illustrated in FIG. 1 in that the application layer 14 is enclosed by the system layer 12. The application layer 14 is configured to interact with the system layer 12.

A hardware/software environment is the hardware and software on which the application layer 14 and the system layer 12 are executed. Examples of a hardware/software environment are, for example, a Windows PC, an embedded system with minimal operating system, or a cloud server.

The application layer 14 is implemented so that it is independent of the specific hardware/software environment. However, all specific implementations of a system layer 12 offer an interface 13 which is uniform with respect to the application layer 14. The system layer 12 and the application layer 14 are interconnected via the uniform interface 13 and are configured to interact with one another independently of the client 10. As a result, the application layer 14 can be ported as needed to new hardware/software environments without changes. For example, there might be system layers 12 for different processors such as ARM or PowerPC, or different operating systems such as Linux or Windows.

The application layer 14 is hardware-independent. The application layer 14 comprises, for example, menu navigation, diagnostic functionality, a measured value processing for measured pH values, for measured values for conductivity, or for other measurement variables. The application layer 14 furthermore comprises, for example, a Fieldbus connection or interfaces for inputs and outputs (not shown).

Finer segmentations in applications and basic systems (not shown) are also conceivable for a specific embodiment of an application layer 14, for example. The applications then include, for example, the measured value processing, diagnosis functionality, and menu navigation, whereas the base system provides the Fieldbus connection and input/output interfaces.

If the system layer 12 is implemented as a server, the software can be uncoupled from specific measurement transducers and can be experienced and used beyond the boundaries of the measurement transducer, whereby the most varied use cases can be realized. A server is software that offers the functionality of the application layer 14 to one or more clients 10, 10', . . . , 10n as a service.

The client 10 and the system layer 12 communicate via a network protocol NP, for example. For example, the network protocol NP is a "Hypertext Transfer Protocol", called HTTP for short, or a "Hypertext Transfer Protocol Secure", called HTTPS for short, which is transmitted via a "Transmission Control Protocol/Internet Protocol", also called TCP/IP. The communication via HTTP or HTTPS takes place, for example, by means of a "Representational State Transfer application programming interface", also called a REST API. A system layer 12 that is implemented as a server communicating over TCP/IP, at least via HTTP or HTTPS, is called a web service 4.

Figure 2:
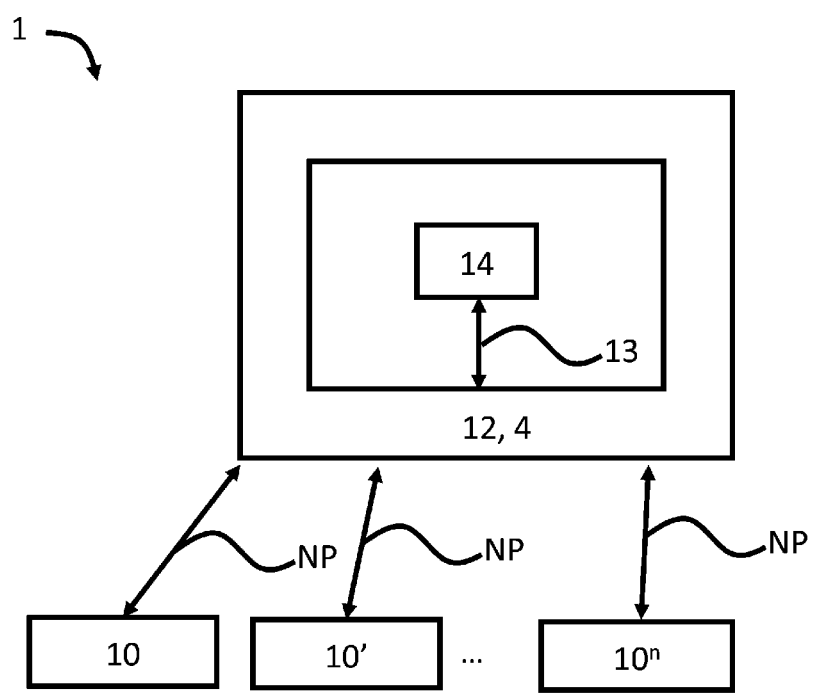
FIG. 2 shows an embodiment of the hardware-software communication system from FIG. 1.
Figure 3:
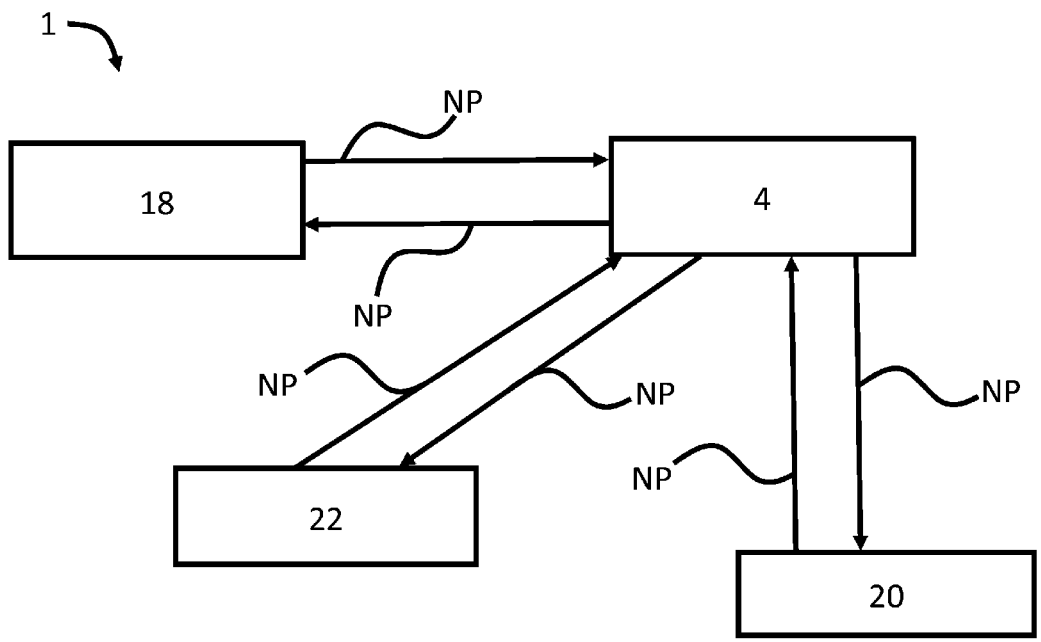
FIG. 3 shows a detail section of another embodiment of the hardware-software communication system.

FIGS. 2 and 3 show an embodiment in which the system layer 12 is designed as a web service 4. The web service 4 runs on a cloud server, for example, i.e. it is accessible via the Internet. This means that the cloud server in this example is the hardware/software environment of the web service 4.

As shown in FIG. 2, the hardware-software communication system 1 may also comprise a plurality of clients 10, 10', . . . , 10n.

In the event of a plurality of clients 10, 10', . . . , 10n, as shown in FIG. 2, the web service 4 communicates individually with the respective clients 10, 10', . . . , 10n.

The web service 4 communicates with one or more clients 10 via the network. The contents of the communication are, for example, display data, measured values, events that have occurred (e.g. main menu has been selected), or results of executed actions. Data which are transmitted from the web service 4 to the client 10 thereby come from the application layer 14. Data transmitted from the client 10 to the web service 4 are passed on to the application layer 14.

As shown in FIG. 3, the client 10 may be designed as what is known as a thin client 18. A thin client 18 has only minimal capability, i.e. the thin client 18 has an input unit, a communication module, and a display, for example. A user may input information via the input unit. The actual measured value processing runs on the server. The communication module of the thin client 18 sends the input, for example raw data or data for menu navigation, to a higher-level system, for example to a cloud server which [is] implemented as a web service 4 server, for example. The higher-level system is suitable to send a response, for example data to be displayed, to the thin client 18. The thin client 18 may display the received data via the display. In one embodiment, the thin client 18 periodically queries the current state of the processing from the web service 4 and displays measured values on its display.

If the measured value processing takes place in a web service 4, remote access or a remote diagnosis is also easily possible. In this instance, the component for the remote access is another client 10' which communicates with the web service 4. The remote access client 10' is a web browser 22, for example. FIG. 3 shows the web browser 22, which is suitable to send data for menu navigation and receive data to be displayed.

As is also shown in FIG. 3, the client 10 may also include a control system 20. The control system 20 is suitable to send commands to the web service 4 and to receive measured values from the web service 4.

If the measurement transducer software runs in a web service 4, and the communication interfaces between the client 10 and the web service 4 remain stable, then given an update only an updating of the software in the web service 4 is necessary in this instance. This use case is shown in FIG. 4.

Figure 4:
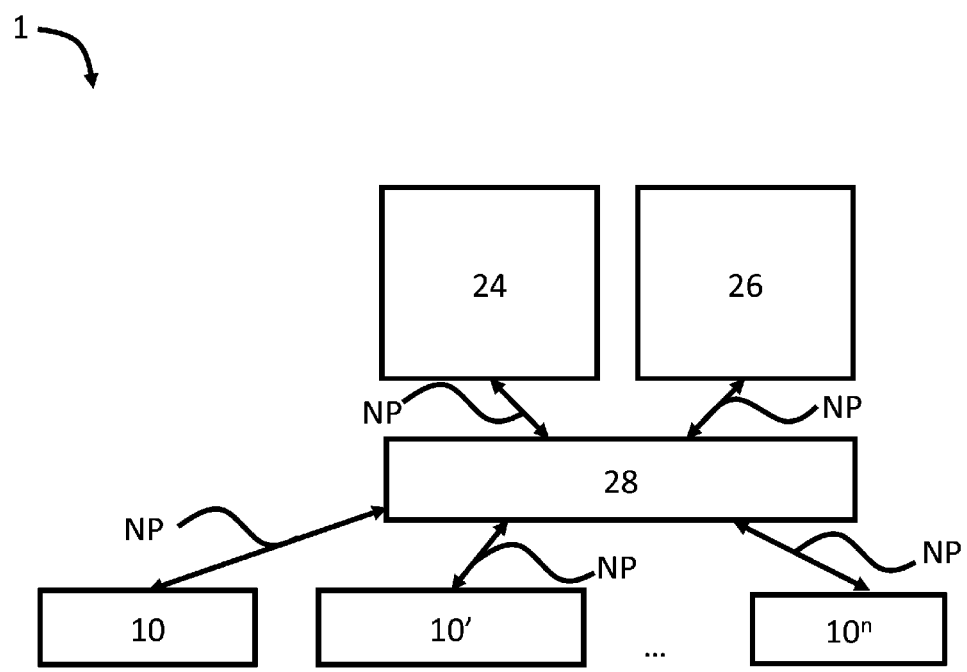
FIG. 4 shows a detail section of an additional embodiment of the hardware-software communication system.

FIG. 4 also shows that the hardware-software communication system 1 may comprise a routing component 28, a first software version 24, and a second software version 26. The routing component 28 takes over the communication with the clients 10, 10', . . . , 10n and relays the requests to the first software version 24 or the second software version 26. The routing component 28 communicates via network protocol NP.

The first software version 24 and the second software version 26 are respectively embodiments of the system layer 12 and the application layer 14. The second software version 26 is, for example, expanded by additional functions relative to the first software version 26.

The first software version 24 and the second software version 26 are, for example, implemented as a web service 4. The routing component 28 is, for example, based on a load balancer for HTTP or HTTPS, which receives requests from the clients 10, 10', . . . , 10n and relays them to the first software version 24 or the second software version 26.

If a software update of one or all clients 10, 10', . . . , 10n is to be implemented, first the second software version 26 is installed on the server hardware-software communication system 1. As long as the update is running, the routing component 28 relays all communication, as before, to the first software version 24. If the second software version 26 is ready for operation, all new communication is relayed by the routing component 28 to the second software version 26. As soon as no client 10, 10', . . . , 10*n* communicates anymore with the first software version 24, this software version may be removed from the hardware-software communication system 1.

However, scenarios are also conceivable in which a plurality of software versions are operated in parallel. For example, if the communication interfaces or protocols change between two software versions, then the measurement transducers must also be updated. This may occur in stages: already updated measurement transducers use the new second software version 26, old measurement transducers communicate with the previous first software version 24. This incremental communication is also controlled by the routing component 28.

In the event that a client 10, 10', . . . , 10*n* is designed as a web browser 22, the measurement transducer functionality, which essentially consists of software, may be made capable of being experienced online. If the software of an existing measurement transducer is restructured into an application layer 14 and a system layer 12 and the system layer 12 is embodied by a web service 4, or if the measurement transducer software already has this segmentation, then customers may try out a measurement transducer via web browser 22 in advance and do not first need to hold a specific product in their hands.

Figure 5:
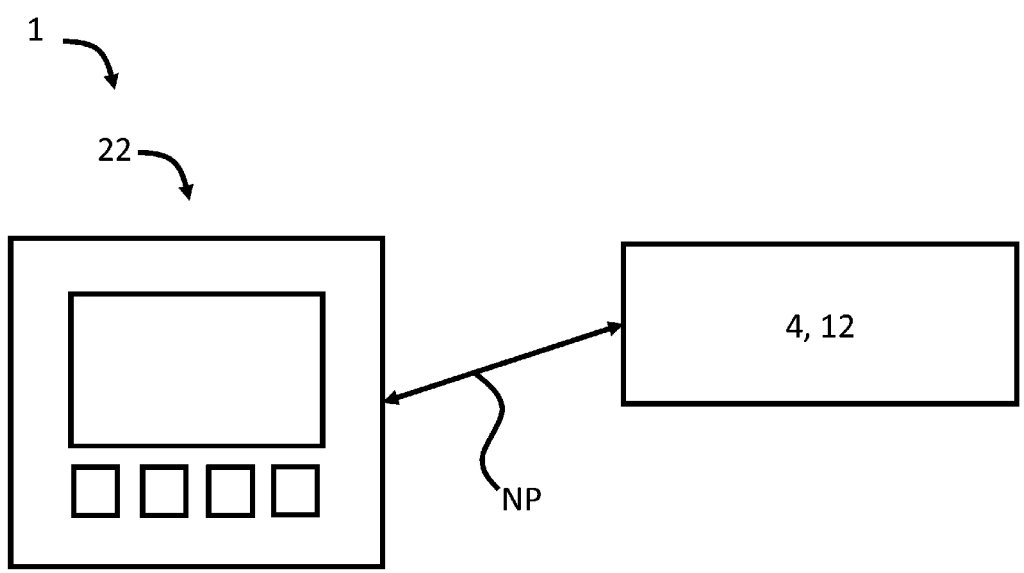
FIG. 5 shows a detail section of an additional embodiment of the hardware-software communication system.

FIG. 5 shows this embodiment. In this instance, the software for a given measurement transducer product is installed as a web service 4 on a cloud server, i.e. for example within a web page or a company web shop. The company web page is constructed so that an interactive interface similar to a measurement transducer is established in a user's web browser 22. This interface thereby communicates with the web service 4, for example in order to inform the web service 4 about key presses, which the service forwards to the measurement transducer software. Analogously, for example, the web service 4 may also provide display contents to the web browser 22 that are to be displayed, which are then displayed in the simulated display. Since the display and the keys are based on the real product, the software in the web service 4 behaves in the same way as the software in the specific measurement transducer. Therefore, a user can form an impression of the specific product on-line in advance.

Such an embodiment is also suitable, for example, for offering training with regard to a specific device by means of a web browser 22. This may thus be realized as an interactive online course, for example.

The invention claimed is:

1. A hardware-software communication system for sensor signal monitoring in process automation technology, comprising:
 a client providing the sensor signal and/or commands;
 a system layer; and
 a hardware-independent application layer configured to process the sensor signal, wherein the client and the system layer are communicatively connected and are configured
to communicate with one another via a network protocol for transferring the sensor signal and/or the commands to the system layer and for transferring a sensor signal response received from the application layer to the client,
 wherein the network protocol is HTTP or HTTPS,
 wherein the system layer and the application layer are interconnected and are configured to communicate with one another independently of the client for transferring the sensor signal and/or the commands to the application layer and for sending the sensor signal response to the system layer,
 wherein the system layer is implemented as a server designed as a web service, and the web service includes a measurement transducer software embodied to simulate a functionality of a measurement transducer, and
 wherein the client comprises remote access via a web browser, and the web browser is suitable to display a web page with the simulated measurement transducer.

2. The hardware-software communication system according to claim 1, further comprising:
 an additional client embodied as one of the following: a measurement transducer as a thin client, a control system, and a remote access via web browser.

3. The hardware-software communication system according to claim 1, wherein the system layer and the application layer are suitable to be embodied as a software version, and the hardware-software communication system includes at least a first software version and a second software version and a routing component, wherein the routing component is suitable to connect said first version and/or said second version to the client.

4. The hardware-software communication system according to claim 3, wherein the hardware-software communication system includes at least two clients, and the routing component is suitable to initially connect both clients to the first version and then connect at least one client only to the second version.

5. The hardware-software communication system according to claim 3, wherein the first software version and the second software version are constructed like a web service, and the routing component is a load balancer for HTTP or HTTPS.

6. A hardware-software communication system for sensor signal monitoring in process automation technology, comprising:
 a first client providing the sensor signal;
 a second client providing remote access via a web browser;
 a system layer implemented as a server, and the server is designed as a web service; and
 a hardware-independent application layer for processing the sensor signal,
 wherein the first client and the system layer are communicatively connected and are configured to communicate with one another via a network protocol for transferring the sensor signal to the system layer,
 wherein the second client and the system layer are communicatively connected and are configured to communicate with one another via the network protocol for transferring a sensor signal response received from the application layer to the second client,
 wherein the system layer and the application layer are interconnected and are configured to communicate with one another independently of the first client and of the second client, wherein the system layer and the application layer include a measurement transducer software, and wherein the system layer and the application layer provide a simulated measurement transducer that is accessible via the web browser, and
 wherein the second client is configured to access via the web browser the simulated measurement transducer.

\* \* \* \* \*